Feb. 12, 1957  W. C. BELK ET AL  2,780,988
METHOD OF AND APPARATUS FOR PROCESSING WHOLE FRUIT
Filed Feb. 24, 1953  6 Sheets-Sheet 5
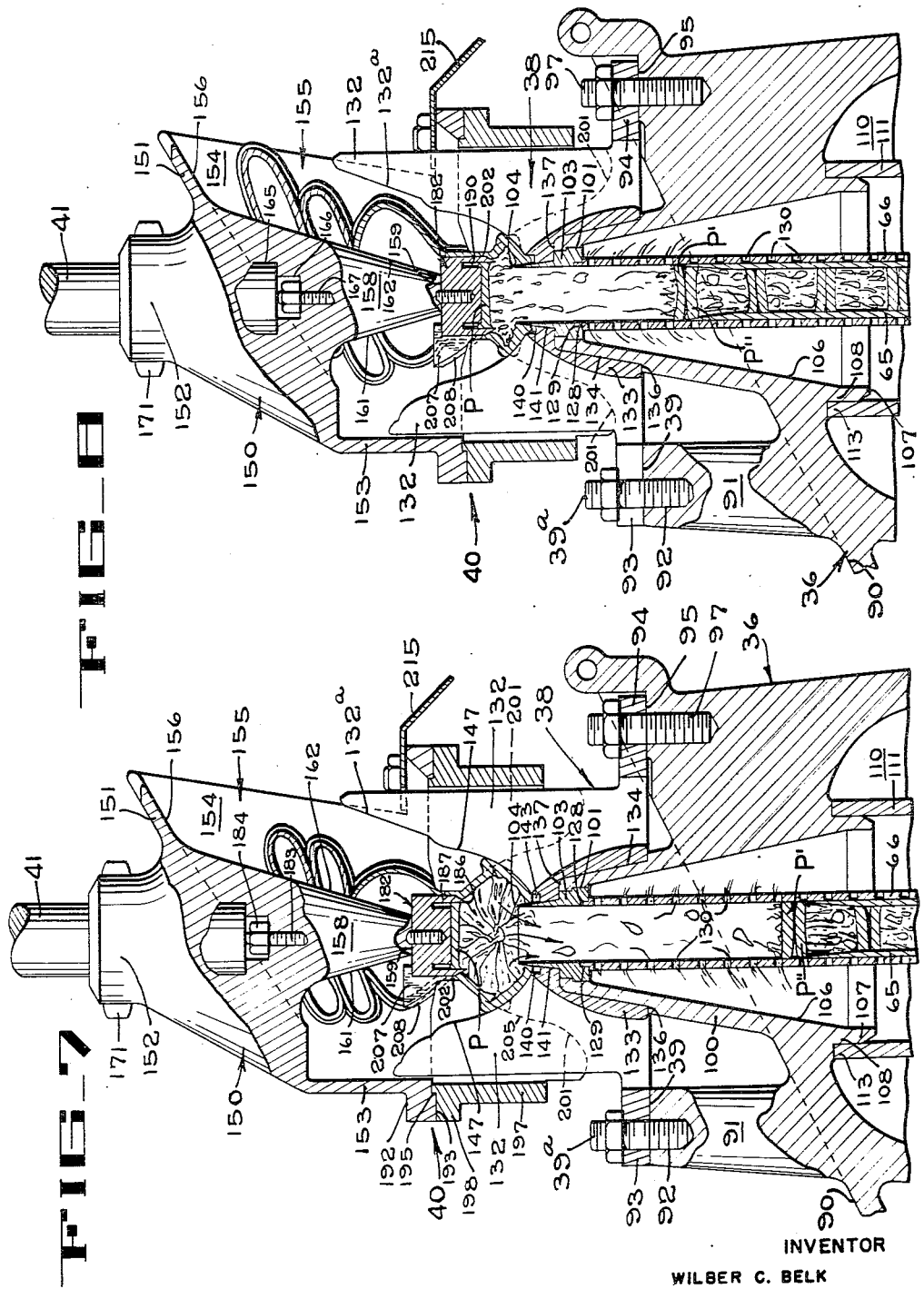
INVENTOR
WILBER C. BELK
ELMER F. FROST, JR.
BY *Hans G. Hoffmeister*
ATTORNEY

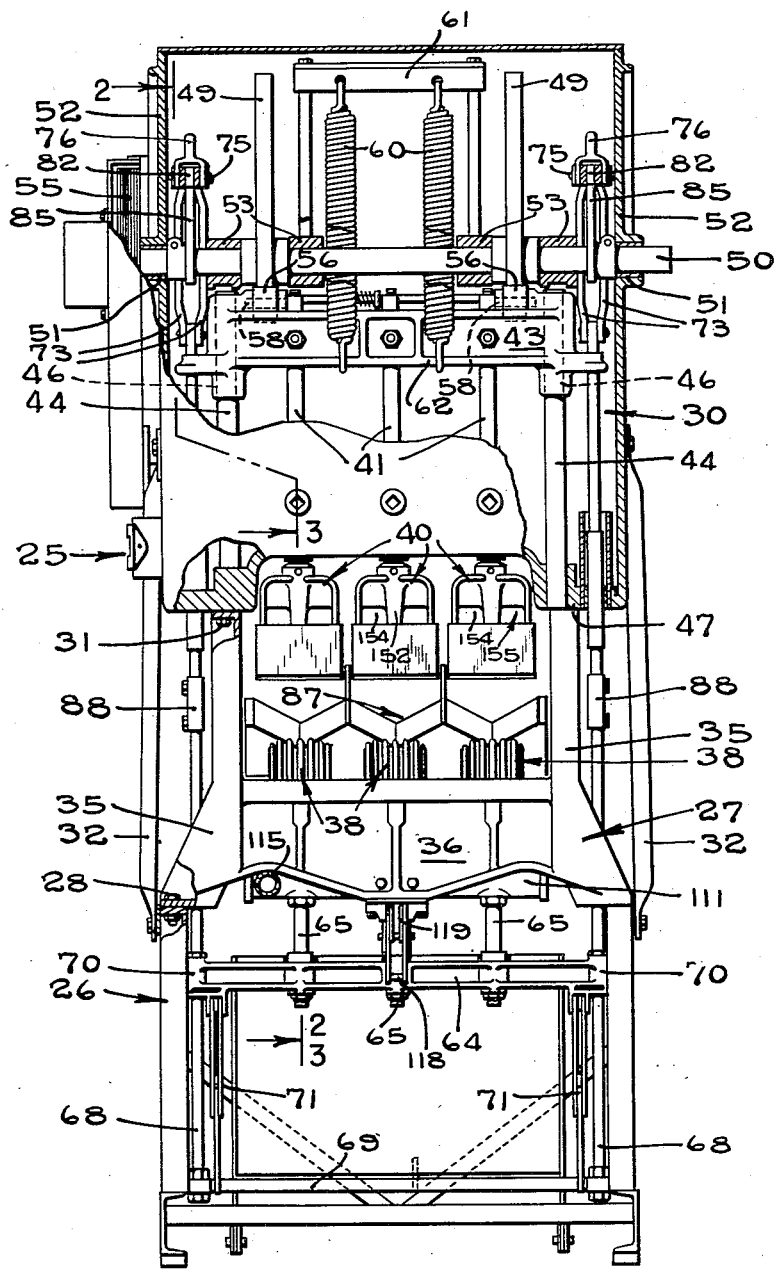
FIG_1

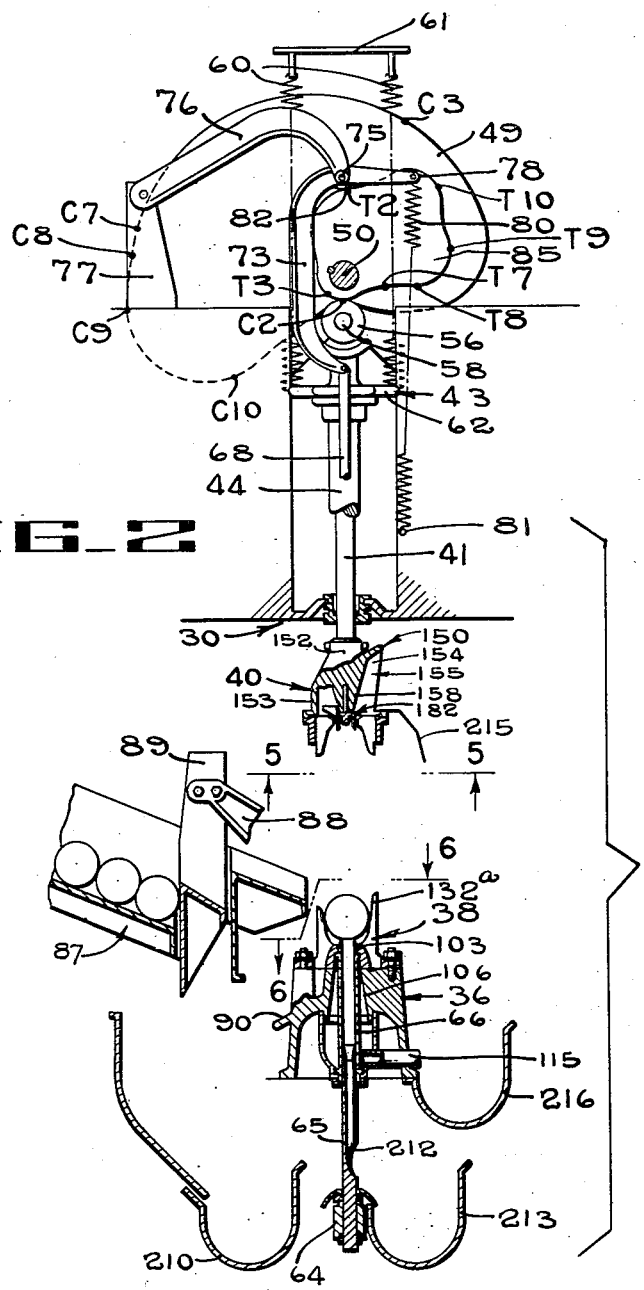

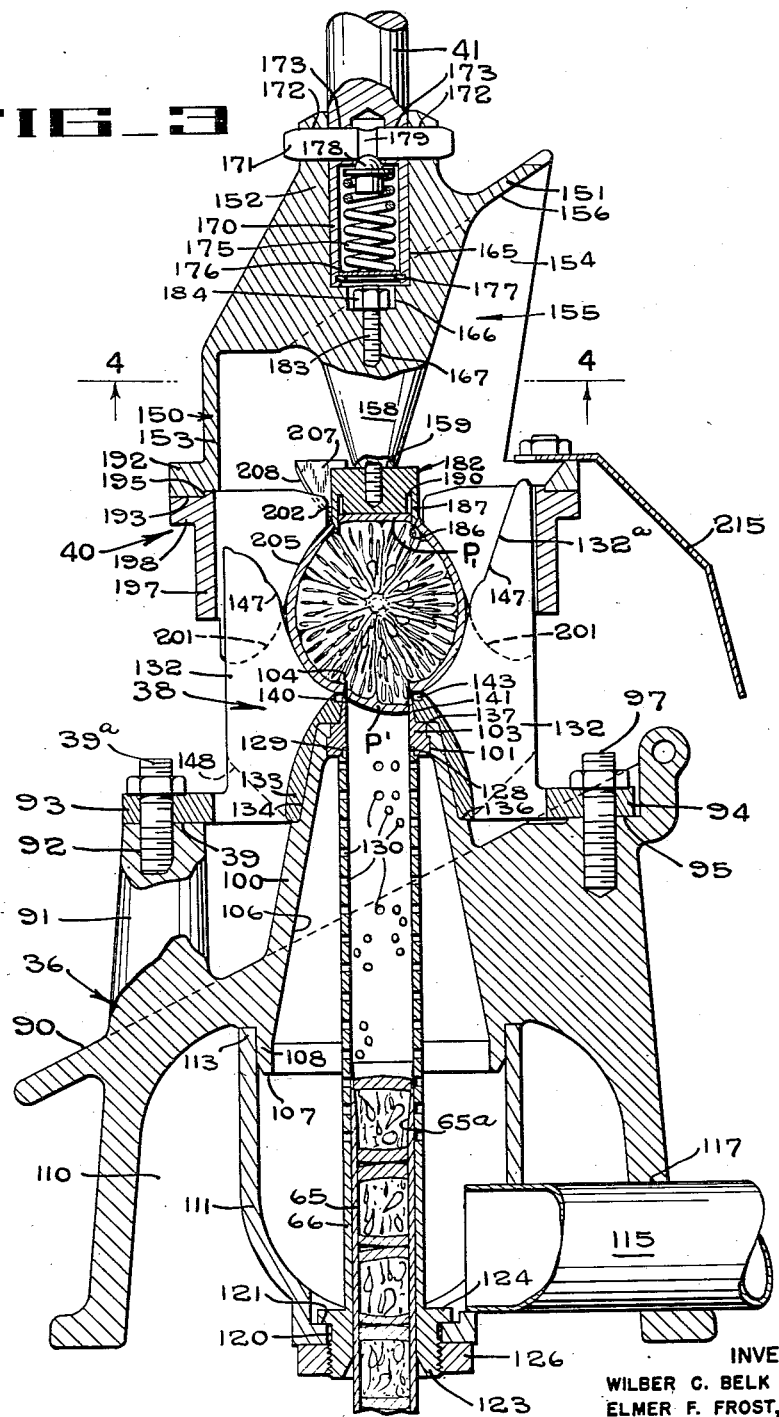

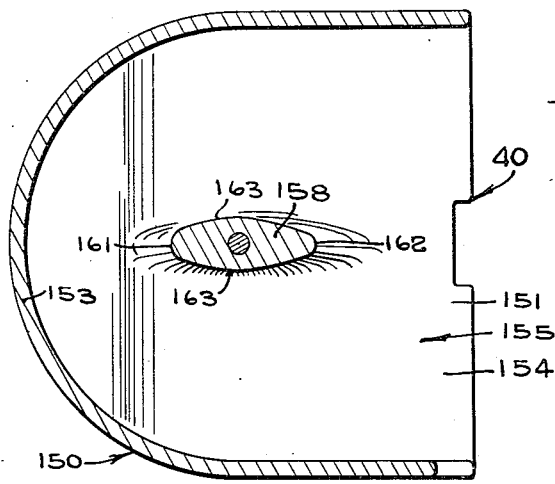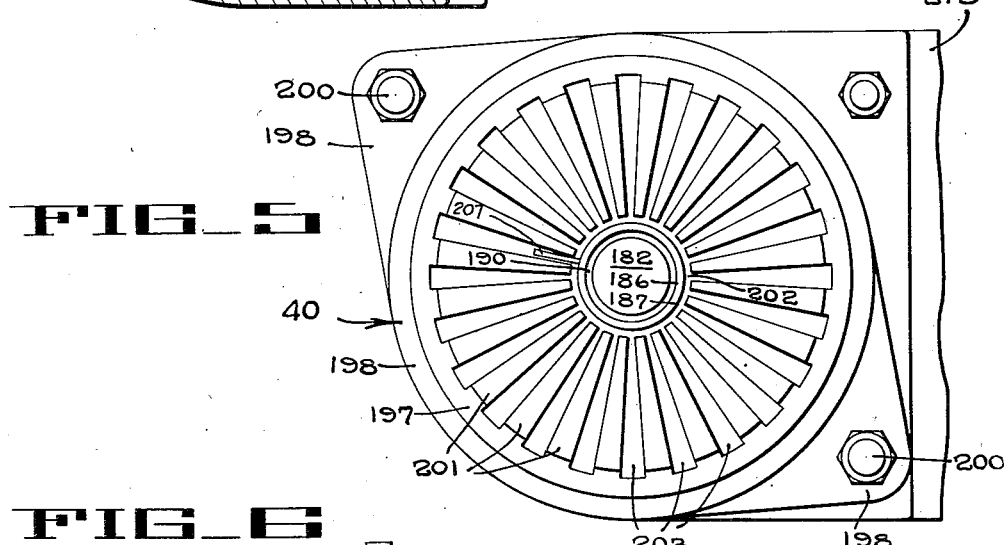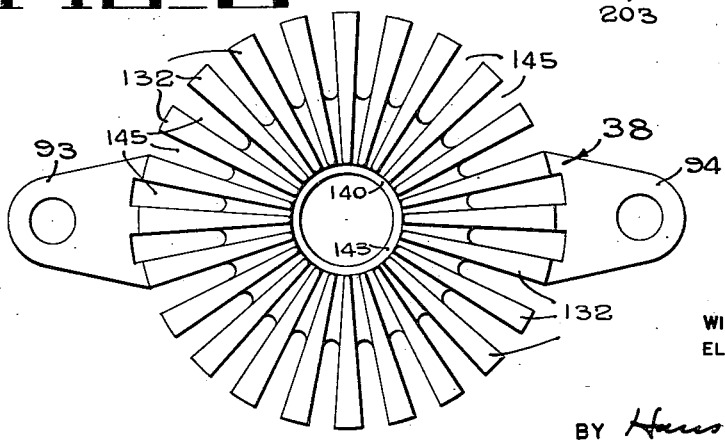

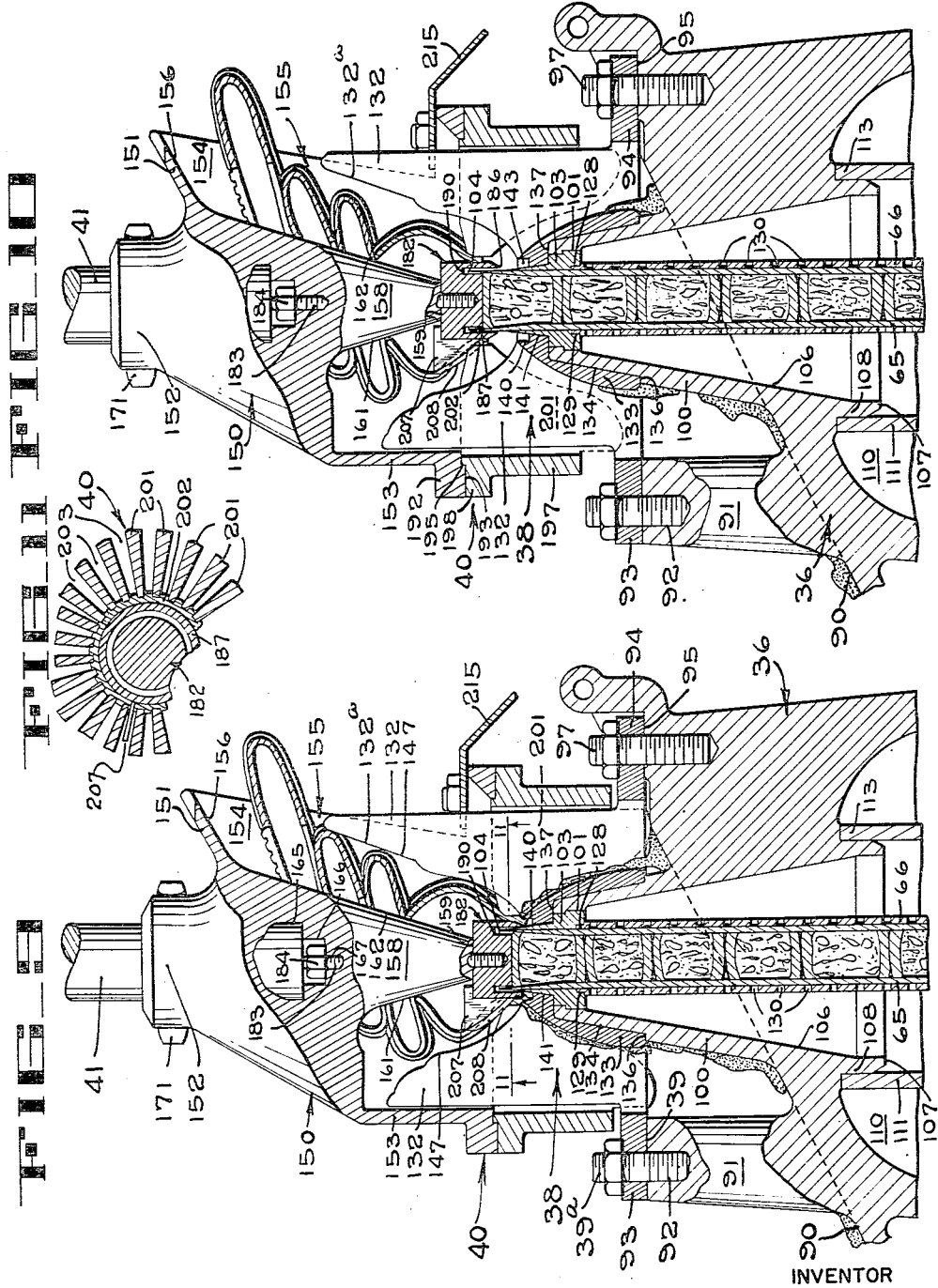

United States Patent Office 2,780,988
Patented Feb. 12, 1957

2,780,988

METHOD OF AND APPARATUS FOR PROCESSING WHOLE FRUIT

Wilber C. Belk and Elmer F. Frost, Jr., Lakeland, Fla., assignors to Food Machinery and Chemical Corporation, San Jose, Calif., a corporation of Delaware Application February 24, 1953, Serial No. 338,234

8 Claims. (Cl. 100—37)

This invention pertains to the art of processing whole fruit and more particularly relates to an improved method of and apparatus for extracting juice and peel oil from citrus fruit such as oranges, grapefruit, lemons and limes.

To completely process citrus fruit in a single machine, it is necessary that the machine be capable of extracting and collecting the juice, extracting and collecting the peel oil, breaking up and ejecting the peel and de-juicing and discharging the pulp and internal membranes of the fruit. Several fruit processing machines have been proposed which have been particularly designed to carry out a part of the complete process, especially the juice extracting operation. However, none of the machines currently in use performs all four of the above-enumerated operations.

It is, therefore, an object of the present invention to provide a machine adapted to receive a fruit, such as an orange, and in a single operation completely process the orange and separately collect the juice, the peel, the peel oil, and the pulp and internal portions of the orange.

Another object is to provide a fruit processing machine having novel means for extracting peel oil from the peel of citrus fruit.

A further object is to provide a fruit processing machine having an improved means for breaking up and ejecting peel.

Another object is to provide a novel method of processing a whole fruit.

Other and further objects and advantages of the present invention will become apparent from the following description taken in connection with the accompanying drawings in which:

Fig. 1 is a rear elevation of the juice extracting machine of the present invention, with parts broken away to clearly illustrate the internal operating mechanism.

Figure 2 is a diagrammatic view taken along lines 2—2 of Fig. 1, and illustrating the various elements of one juice extracting unit of the machine in their position at the beginning of a cycle of operation thereof.

Fig. 3 is an enlarged vertical section taken on lines 3—3 of Fig. 1, showing the elements at the start of the compression of the fruit.

Fig. 4 is a horizontal section taken along lines 4—4 of Fig. 3.

Fig. 5 is a bottom view of the upper cup of one of the juice extracting units of the present invention, taken in the direction of arrows 5—5 of Fig. 2.

Fig. 6 is a plan view of the lower cup of the juice extracting unit taken in the direction of arrows 6—6 of Fig. 2.

Fig. 7 is an enlarged vertical section, similar to Fig. 3, illustrating the elements of the apparatus in a position in which the orange has been partially compressed.

Fig. 8 is an enlarged view similar to Fig. 7 and showing a subsequent stage in the compressing of the orange.

Fig. 9 is an enlarged view similar to Fig. 8 but illustrating a subsequent stage of operation wherein the orange has been fully compressed and the peel has been ejected upwardly.

Fig. 10 is an enlarged view similar to Fig. 9 showing the position of the elements of the apparatus after the processing of the orange has been completed and the upper cup is being lifted away from the lower cup.

Fig. 11 is a fragmentary horizontal section taken on line 11—11 of Fig. 9.

While the machine of the present invention has utility in the processing of citrus fruit in general, a preferred embodiment of the machine arranged to process oranges will be illustrated and described in the following specification.

The present invention constitutes an improvement over the juice extracting machine described and claimed in the co-pending application of J. M. Hait Serial No. 76,748, filed February 16, 1949, now Patent Number 2,649,730, granted August 25, 1953. The supporting frame of the present machine is identical to that of the Hait machine, as are also the drive mechanism, and the mounting of the operating parts in the support frame. Complete details of the assembly and the manner in which the various parts cooperate may be found in the Hait application.

In general, the fruit processing machine of the present invention (Fig. 1) comprises a support frame 25 which includes a rigid base section 26, an intermediate section 27 supported on and rigidly secured to the base 26 by a plurality of bolts 28, only one of which is shown and a top power head 30 supported on the intermediate section 27 and secured thereto by a plurality of bolts 31, only one of which is shown in Fig. 1. Diagonally extending tie bars 32 are connected on each side of the machine between the base 26 and the power head 30 to rigidify the structure.

The intermediate section 27 comprises spaced, upstanding side members 35 between which a stationary, transversely extending bedplate 36 is supported. A series of spaced orange-receiving lower cups 38 are secured in rigid stationary position on a top, flat support surface 39 (Fig. 3) of the bedplate 36 by stud bolts 39a. In Fig. 1, a bedplate 36 is shown which is adapted to support three lower cups 38. It should be understood, however, that the bedplate may be made of a width sufficient to accommodate any practicable number of lower cups.

An upper cup assembly 40 is mounted on the lower end of a rod 41 above each lower cup 38 so that the upper cup may be moved directly downwardly to engage an orange disposed in the lower cup. Each cup supporting rod 41 is secured at its upper end to a crosshead 43 (Fig. 1) which is mounted for vertical reciprocal movement inside the power head 30. The crosshead 43 is guided in its vertical movement by two stationary upstanding rods 44 which are slidably received in vertical guide apertures 46 in the crosshead. At their lower ends the rods 44 are secured in a bottom wall 47 of the frame of the power head 30.

The crosshead 43 is moved downwardly to carry the upper cups 40 into engagement with the oranges in the associated lower cups by means of a pair of spaced cam discs 49 (Figs. 1 and 2) which are keyed on a shaft 50. The shaft 50 is rotatably journalled in a bearing 51 in each side wall 52 (Fig. 1) of the power head 30 and in bearings 53 supported interiorly of the power head 30 on bulkheads (not shown). The shaft 50 is driven by an electric motor (not shown) through a chain and sprocket drive 55. Cam follower rollers 56 (Figs. 1 and 2) are disposed for free rotation on stub shafts 58 provided on the upper side of the crosshead 43. The rollers 56 are kept constantly in contact with the cams 49 by springs 60 (Fig. 1), the opposite ends of which are connected to a stationary support bar 61 in the power head 30 and to a flange 62 of the crosshead 43. Referring to Fig. 2, it will be seen that when the shaft 50 and the cam disc 49 keyed thereon are rotated clockwise, the follower rollers 56 and the crosshead 43 on which it is carried are moved rapidly downwardly toward the stationary lower cup 38.

In the base section 26 (Fig. 1) of the frame of the machine, a crossbeam 64 is mounted for vertical reciprocation. Three spaced orifice tubes 65 are secured in upright position on the crossbeam 64 and each tube has an upper beveled end 65a (Fig. 3). The tubes 65 extend upward from the crossbeam 64 into a finisher tube 66, one of which is mounted in the bedplate 36 below each lower cup 38, as best seen in Fig. 3. As the crossbeam 64 is reciprocated, each orifice tube 65 slides up and down in the associated finisher tube 66. The crossbeam 64 is reciprocated by two rods 68 (Fig. 1) which extend upwardly at each side of the machine and are connected at their lower ends for conjoint movement by a transverse bar 69. Each rod 68 is slidably disposed in a bearing 70 formed on one side of the crossbeam 64. The crossbar 69 is actuated by the side rods 68 and movement of the crossbar 69 is transmitted to the crossbeam 64 through a pair of transversely spaced over-center linkages 71 pivotally connected at their upper ends to the crossbeam 64 and at their lower ends to the bar 69. At its upper end, each side rod 68 is pivotally connected to the lower ends of a pair of upstanding links 73 (Figs. 1 and 2) which are rotatably journalled at their upper ends on a pin 75 carried by a forked end of a lever 76. The lever 76 is pivotally mounted at its opposite end on a standard 77 suitably supported in upright position in the power head 30. Each upstanding link 73 has a free end portion 78 (Fig. 2) that extends forwardly of the pin 75 to receive the upper end of a tension spring 80, the lower end of which is anchored at 81 on the frame of the power head 30. A cam follower roller 82 (Fig. 1) is rotatably journalled on the pin 75 between the links 73. Thus, two springs 80 are constantly exerting a downward pull on the links 73 for holding the cam follower roller 82 in contact with the camming surface of a cam disc 85 which is also keyed to the shaft 50. In Fig. 2, it will be seen that when the shaft 50 and the cam disc 85 are rotated in clockwise direction, the side rods 68 are lowered under the urging of the springs 80. Thus the orifice tubes 65 are moved in timed relation with the upper cups, since they are each controlled by cams keyed on the same shaft.

A shuffle feeder mechanism 87 (Fig. 2) is arranged to deliver an orange to each lower cup after a preceding orange has been processed. The feeder is actuated in timed relation with the movement of the upper cups and the orifice tubes through arms 88 (Figs. 1 and 2) connected between a feeder member 89 of the feeder and one of the orifice tube control arms 68.

At this point it will be apparent that, after an orange is deposited in each stantionary lower cup 38 by the shuffle feeder 87 (Fig. 2), the associated upper cup 40 is moved downwardly by the large cam disc 49 to engage the orange. At the same time the orifice tube 65 below the lower cup is raised in the finisher tube 66 in timed relation with the lowering of the upper cup.

The bedplate 36 (Fig. 3) of the intermediate support frame section 27 has a continuous top wall 90 (Fig. 3) that extends entirely across the machine under all the cups and slants downwardly and rearwardly to provide a drain off for peel oil extracted from the peel during the processing of the orange. A post 91, integrally formed on the top wall 90, extends upwardly therefrom directly opposite each cup 38. A tapped opening 92 in the top surface of each post 91 receives the threaded shank of the stud bolt 39a which anchors, to the post, a tab 93 extending outwardly from each lower cup assembly (Figs. 3 and 6). A diametrically opposite tab 94 is anchored on a flattened surface 95 of the top wall 90 by a stud bolt 97. Directly under each lower cup 38, a support member 100 (Fig. 3) having a segmental conical exterior surface, extends upwardly from the top wall 90 of the bedplate 36. The support member 100 has a cylindrical aperture 101 at its upper end into which a generally tubular lower cutter unit 103 is pressed. This cutter unit has an upper circular cutting edge 104 to cut a circular plug from the orange when the orange is pressed downwardly against the cutting edge. The support member 100 has a downwardly opening and flaring juice passage 106 terminating at its lower end in a lip 107 which is surrounded by a shoulder 108. The base of the bedplate 36 is hollowed out to provide a transverse discharge chamber 110 in which a juice collecting manifold 111 is mounted. The manifold 111 is generally U-shaped in cross-section and extends transversely of the machine under all of the lower cup assemblies. Directly under each cup, the manifold has an upwardly extending circular flange 113 which fits snugly over the lower lip 107 for seated engagement against the shoulder 108. An outlet tube 115 extends through one side wall of the manifold 111 and through an opening 117 in the wall of the bedplate 36 to carry off the accumulated juice to a suitable receptacle (not shown). A latch 118 (Fig. 1) has a swingable support arm 119 disposed under the center portion of the manifold for supporting the manifold in position.

The manifold 111 is also provided with a series of annular openings 120 (Fig. 3) in its lower wall, one opening being in alignment with and directly below each tubular lower cutter unit 103. A flattened surface 121 is formed interiorly of the manifold around each annular opening 120. The finisher tube 66 is mounted in upright position in each opening 120 with an enlarged threaded end 123 extending therethrough and an internal annular flange 124 bearing against the flattened surface. A nut 126 is threaded on the end 123 of the tube 66 locking it in upright position on the manifold 111. The tube extends upwardly through the manifold 111 and through the associated juice passage 106 and has an upper reduced end portion 128 disposed in close fitting, guided engagement in an internal annular recess 129 in the lower cutter unit 103. The walls of each tube 66 are provided with small perforations 130 from the upper end thereof to a point a slight distance below the lower end of the juice passage 106.

Each lower cup 38 (Figs. 2, 3 and 6) comprises a series of fingers 132 which are equally spaced circumferentially and extend radially inwardly toward a central hub 133 with which they are integrally formed. The hub 133 is hollow and is provided with an internal slanted surface 134 that mates with the conical surface of the support member 100. A lower annular end face of the hub rests on an annular shoulder 136 formed on the exterior surface of the support member 100 and an internal flattened upper end wall 137 of the hub rests on the flattened top end of the support member 100. The hub has an opening at its upper end defined by a counterbore 140 and by a tapered surface 141 that wedgingly engages a similar exterior surface of the cutter unit 103. An annular recess 143 is defined between the upper end of the circular cutter and the wall of the counterbore.

Looking downward on the lower cup assembly in Fig. 6, it will be seen that the fingers 132 of the cups 38 are uniformly shaped and each adjacent pair of fingers is separated by a slot 145 which is slightly wider than one of the fingers 132. It is also to be noted that each mounting tab 93 and 94 is connected to the hub 133 through its connection with the outer ends of three fingers. The fingers (Figs. 2 and 3) extend upwardly above the hub 133 and have downwardly and inwardly slanted edges 147 that define a pocket in which the orange is held as it is processed. Several of the fingers at the rearward side of the lower cup assembly extend upwardly to a point higher than the rest of the fingers to form a high abutment wall 132a to prevent an orange, which enters the machine at the front side thereof, from escaping over the rear edge of the cup as it is directed into the cup by the feeding mechanism 87. All of the fingers, except those secured to the tabs 93 and 94, have inwardly inclined lower edges 148 (Fig. 3).

Each upper cup assembly 40 (Figs. 3 and 5) comprises a hollow housing 150 open at its lower end and having a top wall 151 with a central hub 152. A skirt-like sidewall 153, depending from the top wall, has an opening 154 at the side facing the rear of the machine providing a discharge passage for the peel as it leaves a discharge chamber 155 formed by the hollow interior of the housing. The top wall 151 has an internal surface 156 slanted upwardly and rearwardly toward the peel discharge opening 154. A support member 158, integrally formed with the top wall 151 of the housing 150, extends downwardly from the top wall and has a flat, horizontal lower end face 159. The support member 158 has a front edge 161 (Fig. 3) and a rear edge 162 that slant upwardly and outwardly, and side edges 163 (Fig. 4) that are substantially vertical. Thus, in horizontal cross section the support member 158 is generally oval. The top wall of the housing 150 has a continuous bore therethrough defined by a large diameter upper bore 165 (Fig. 3), a reduced diameter intermediate bore 166, and a relatively small diameter lower bore 167 which extends downwardly through the support member 158. A tubular lower end 170 of the rod 41, which supports the upper cup assembly, is disposed in the large bore 165 and is retained therein by a pin 171 which extends through aligned openings 172 in the hub 152 and through aligned openings 173 in the tubular end of the rod 41. A spring 175, which is seated on a disc 176 held in the lower end of the rod by a snap ring 177, presses a rounded detent 178 into an annular groove 179 in the outer surface of the pin 171 to prevent sidewise movement of the pin. An upper cutter assembly 182 is mounted on the lower end of the support member 158 by a stud bolt 183 which extends through the small bore 167 and has its nut 184 disposed in the intermediate bore 166, bearing against the shoulder formed between the lower and intermediate bores. The upper cutter assembly 182 has a downwardly directed circular cutting edge 186 formed by a beveled surface on a tubular skirt portion 187 that is in vertical alignment with the annular recess 143 formed around the lower cutter unit 103. In the lowermost position of the upper cup 40, the tubular skirt 187 extends down into the recess 143 and the upper edge of the lower cutter 103 extends into an annular recess 190 formed in the body of the upper cutter inside of and concentric with the skirt 187.

The housing 150 has an outwardly extending flange 192 around the lower end of the side wall 153. The lower surface 193 of the flange is counterbored to provide a cylindrical side wall 195. A collar 197, mounted below the housing 150, has a flange 198 in abutting contact with the flange 192 of the housing and a reduced diameter upper end disposed in guided engagement with the cylindrical sidewall 195 of the counterbore. Looking upwardly at the lower end of the upper cup assembly 40 in Fig. 5, it will be seen that the collar 197 has a pair of diametrically opposed, outwardly extending ears 198 that are bolted to corresponding ear portions on the lower end of the housing 150 by bolts 200. A series of fingers 201 are integrally formed with the collar 197 and extend radially inwardly therefrom to terminate in spaced relation from the outer wall of the upper knife assembly 182 to define an annular passage 202 through which the peel is extruded. The fingers 201 (Fig. 5) which are equally spaced circumferentially and are identical in configuration, are of a size to pass into the slots 145 between adjacent fingers 132 in the lower cup 38 (Fig. 6). Similarly, slots 203 (Fig. 5) formed between the equi-spaced fingers of the upper cup, are adapted to receive the upwardly extending fingers 132 (Fig. 6) of the lower cup 38. In the juice extracting operation the fingers of the upper and lower cups intermesh to a point where the curved inner edges 205 (Fig. 3) of the upper cup assembly 40 substantially abut the mating curved exterior surfaces of the hub 133 (Fig. 9) of the lower cup 38 between adjacent fingers 132.

A flat, upright, knife blade 207 (Fig. 3) having a downwardly directed cutting edge 208, is mounted on the upper knife assembly 182 extending radially outwardly therefrom to span the annular passage 202 defined between the inner ends of the fingers 201 of the upper cup and the outer wall of the upper knife assembly 182.

To more clearly understand the sequence of operations which will be described presently, reference is again made to the showing in Fig. 2 of the cam discs 49 and 85. Since Figs. 2, 3, 7, 8, 9 and 10 will be referred to in describing the operation, the approximate points on the camming surface of the upper cup control cam 49 which correspond to the positions of the upper cup in these figures are indicated as points $C_2$, $C_3$, $C_7$, $C_8$, $C_9$ and $C_{10}$, respectively, on the cam disc profile. Similarly, the approximate points on the camming surface of the cam disc 85, which controls the movements of the orifice tubes 65, are indicated as $T_2$, $T_3$, $T_7$, $T_8$, $T_9$, and $T_{10}$. Therefore, with the shaft 50 and the cam discs 49 and 85 rotating clockwise, as seen in Fig. 2, points $C_3$, $C_7$, $C_8$, and $C_9$ will successively contact cam follower 56 to move the upper cup to its lowermost position. After point $C_9$ passes the follower, the upper cup begins its upward movement until point $C_2$ again contacts the follower. Correspondingly, as the cam disc 85 rotates clockwise, the point $T_2$ moves away from the follower 82 permitting the orifice tubes 65 to drop to their lowermost position, indicated by point $T_3$. Further rotation of the disc 85 brings the points $T_7$, $T_8$, $T_9$, and $T_{10}$ successively into contact with the follower 82 to raise the orifice tubes to their uppermost position in the finisher tubes.

The operation of the machine is started by turning on the electric motor, which drives the shaft 50 (Fig. 2) in a clockwise direction at about 30 R. P. M. As the arm 68 to which the orange feeder control arm 88 is attached, reaches a predetermined position in its upward movement, an orange is discharged into each lower cup 38 directly under the associated upper cup 40 as it begins its downward movement (Fig. 2). When the fingers of the cups reach the intermeshed position of Fig. 3, the orange is firmly gripped by the fingers which apply a substantially uniform pressure to the fruit at all points of contact therewith. The upper cutter 182 has punched a cleanly cut plug P out of the top surface of the orange and the lower cutter 103 has cut a similar plug P' from the lower end of the orange. At this point the squeezing of the orange has begun and the lower plug P' is forced downwardly into the finisher tube 66 with the released juice following close behind. The orifice tube 65 therebelow is in its lowermost position. A quantity of peel from previously processed oranges is disposed in the discharge chamber 155 of the housing 150.

By the time the position illustrated in Fig. 7 is reached, a large portion of the juice has been forced into the finisher tube 66 where it passes through the perforations 130 into the collector manifold 111. The lower plug P' of the orange has been forced down to a position at the upper end of the orifice tube adjacent a plug P" cut from the preceding orange. It will be noted that, at the top of the orange, the outwardly sloping wall of the upper cutter 182 has directed a portion of the peel into the annular space 202 between the outer wall of the cutter and the inner edges of the fingers of the upper cup. By positively directing the peel upwardly into the space 202 at an early phase of the compression operation, the delivery of the peel in substantially a whole piece in the discharge chamber 155 of the housing 150 is assured.

In the position of Fig. 8, the compression of the orange has proceeded to an advanced position wherein most of the juice, the juice cells, and the seed have been forced into the finisher tube 66, and the peel has been further compressed. The orifice tube 65, in its upward movement, carries the plug P' at its upward end to provide a piston effect which forces the juice out through the small perforations 130 of the tube 66. As the space between the plugs P and P' decreases, the juice cells and pulp in this space are compressed and the plug P' is pushed down into the tube. Also the plugs themselves are squeezed to extract juice therefrom. By the time the upper edge of the orifice tube covers the uppermost perforations in the finisher tube, substantially all the juice has been squeezed therefrom and the residue is in a "finished" condition.

In Fig. 8, the peel has been greatly compressed and has been moved further upwardly through the annular passage 202 between the outside surface of the upper cutter 182 and the ends of the fingers 201. By the time the position of Fig. 9 has been reached, the peel is completely extruded upward through the passage 202. The flat knife blade 207, which is disposed across this passage 202, slits the peel, as it passes through and prevents the peel from reaching the discharge chamber thereabove in a closed annular form. In Fig. 11 the action of the inner edges of the fingers 201 of the upper cup 40 on the outer surface of the peel, as the peel passes through the passage, is shown. As the peel passes, the fingers rupture the surface with a shredding action which releases the peel oil cells that are close to the surface of the peel. The oil and the shredded particles of peel are urged downwardly by the lower edges of the fingers causing the oil and peel particles to flow along the outer surface of the hub of the lower cup onto the slanted top wall 90 of the bedplate 36 which directs the oil and shredded particles to a suitable receptacle, as for example a trough 210 (Fig. 2). Any peel oil that has been released previously during the squeezing of the orange will, of course, be washed along with the bulk of peel oil released as the peel is extruded upwardly over the fingers of the upper cup.

In Fig. 9 the cups are shown in a fully closed position. The upper cutting edge of the lower cutter unit and the beveled upper end of the orifice tube 65 extend into the annular recess in the upper cutter unit 182. Similarly the lower cutting edge of the upper cutter unit extends into the annular recess 143 formed in the top of the lower cup hub around the lower cutter unit. This interengagement of the cutter units forms a seal which prevents peel oil from working its way into the finisher tube. Referring to Figs. 3, 7 and 8 it will be noted that, prior to the point where the peel is extruded upwardly, the peel itself provides the seal which prevents peel oil from entering the finisher tube.

In the position of Fig. 10, the upper cup has begun its upward movement away from the lower cup. The plug P has been firmly pressed into the beveled end of the orifice tube 65 due to the fact that the orifice tube continued its upward movement even after the cups were closed, as in Fig. 9. When the orifice tube again moves downwardly it will carry the plug P downwardly with it. Previously processed plugs and residue will eventually be forced out an opening 212 (Fig. 2) for discharge into a receptacle 213. The peel, which was forced into the discharge chamber 155 of the upper cup housing 150, forces peel previously deposited therein, as shown in Figs. 7 to 10, inclusive, out of the discharge passage 154. The slanted, inside surface 156 of the top wall 151 of the housing and the configuration of the support member 158 which extends through the chamber aid in directing the peel to the outside of the housing where it falls on a deflector plate 215 (Fig. 2) and is directed to a suitable receptacle 216.

In summary, during the processing of an orange in the machine of the present invention, the orange is squeezed by the interdigitating fingers 132 and 201 which apply pressure to closely spaced points on substantially the entire area of the rind of the fruit except the area of the two plugs P and P' and except an annular area around the plug P. The fingers not only apply pressure but also prevent the rupture of the skin during the squeezing operation. When the pressure developed during the squeezing reaches a relatively high point the peel is extruded upwardly through the unpressurized, unsupported zone opposite the annular area of rind around the plug P.

During the processing of an orange, a four-way separation of the component parts of the orange is carried out. Juice, which is completely free of seeds, pulp, and peel oil, is collected in the manifold 111 and discharged therefrom through outlet tube 115; pulp, seeds, and other residue is collected in the container 213 as it leaves the orifice tube 65; peel oil is accumulated in the trough 210; and the peel is directed to the receptacle 216. The provision of apparatus for moving the peel upwardly and removing it from an upper chamber in the machine provides an entirely new means for separating the peel from the peel oil which always tends to gravitate downwardly. Further, the provision of means for positively translating the peel over shredding fingers, which not only ruptures the peel surface but also direct the oil and shredded particles in a direction opposite to the direction of movement of the peel, assures the removal of a maximum amount of peel oil from each orange.

While the method and apparatus of the present invention have been described in connection with the processing of oranges, it will be recognized that they can be adapted for processing other fruit such as grapefruit, lemons, limes, tangerines, and the like. The clearances of the intermeshing fingers, the dimensions of the annular passage through which the peel is extruded, and the design of the cam discs and other design changes may be made to accommodate the fruit being processed without changing the basic arrangement of parts which permit the separate collection of each of the four component parts of the fruit.

Having thus described our invention, what we claim as new and desire to protect by Letters Patent is:

1. The method of processing citrus fruit which comprises making an incision in the rind of said fruit, forming an opening in the rind of the fruit opposite said incision, applying compressive forces to the rind surface of the fruit at a zone outside said incision, outside said opening and outside a relatively narrow space immediately adjacent said incision to progressively reduce the volume of said fruit and expel the juice from said fruit through said opening, and continuing the application of said compressive forces to the fruit to discharge the rind from the zone of compression through said narrow space.

2. The method of processing citrus fruit which comprises making an incision in the rind of said fruit, forming an opening in the rind of the fruit opposite said incision, applying compressive forces to the rind surface of the fruit at a zone outside said incision, outside said opening and outside a relatively narrow space immediately adjacent said incision to progressively reduce the volume of said fruit and expel the juice from said fruit through said opening, continuing the application of said compressive forces to the fruit to discharge the rind from the zone of compression through said narrow space, shredding the rind of the de-juiced fruit during discharge thereof through said space to release the rind oil, and directing the released rind oil away from the discharging de-juiced fruit.

3. The method of processing citrus fruit which comprises forming a circular incision in the rind at the top of the fruit, forming an opening in the rind at the bottom of the fruit, applying compressive forces to the rind surface of the fruit at a zone outside said incision, outside said opening, and outside a relatively narrow annular space immediately around said incision to progressively reduce the volume of said fruit and expel the juice from said fruit through said opening, continuing the application of said compressive forces to the fruit to discharge the rind from the zone of compression upwardly through said annular space, shredding the outer surface of the rind of the fruit as it passes through said annular space to release rind oil, and guiding the rind oil downwardly away from the upwardly discharging rind.

4. Apparatus for processing citrus fruit comprising upper and lower opposed compression members having contact surfaces defining a fruit holding receptacle adapted to support the fruit, a circular cutter mounted in stationary position on said lower compression member and having a cutting edge extending into said receptacle to cut into the lower surface of the rind of a fruit in said receptacle and remove a circular section of rind therefrom during compression of the fruit to form an opening in the fruit, said contact surfaces being adapted to engage the rind surface of the fruit and apply compressive forces thereto at a zone substantially encircling the fruit to expel juice through said opening, means for directing juice from said receptacle, and annular cutter means carried by said upper compression member and extending into said receptacle to make a circular incision in the rind of the upper portion of the fruit during initial compression of the fruit, said cutter means being spaced radially inwardly from the contact surfaces of said upper compression member to define an annular passage between said upper compression member and said cutter means, said passage being positioned adjacent said compression zone to provide egress for de-juiced fruit forced out of said receptacle by said compression members.

5. A device for processing whole citrus fruit comprising a stationary cup, a movable cup coaxial with said stationary cup, each of said cups having a bowl-like cavity defined by a portion of the inner edges of a multiplicity of radially disposed narrow fingers separated by correspondingly narrow slots, the fingers of each cup being aligned with the slots of the other cup for interdigitation and the cavities of said cups being shaped so that said inner edges contact the outer surface of a single fruit at areas disposed substantially entirely around the fruit upon initial interdigitation of said fingers, a tubular cutter mounted in said stationary cup having a cutting edge extending into the cavity of said stationary cup to cut a plug from the fruit upon initial interdigitation of said fingers, the axial opening of said tubular cutter providing a passage through which juice may escape, a circular cutter mounted in said movable cup and having an annular cutting edge extending into the cavity of said movable cup to cut a circular incision in the fruit upon initial interdigitation of said fingers, and means defining an annular passage around the circular cutter in said movable cup through which peel is forced as the interdigitation proceeds.

6. A device for processing whole citrus fruit comprising a stationary cup, a movable cup coaxial with said stationary cup, each of said cups having a bowl-like cavity defined by a portion of the inner edges of a multiplicity of radially disposed narrow fingers separated by correspondingly narrow slots, the fingers of each cup being aligned with the slots of the other cup for interdigitation and the cavities of said cups being shaped so that said inner edges contact the outer surface of a single fruit at areas disposed substantially entirely around the fruit upon initial interdigitation of said fingers, a tubular cutter mounted in said stationary cup having a cutting edge extending into the cavity of said stationary cup to cut a plug from the fruit upon initial interdigitation of said fingers, the axial opening of said tubular cutter providing a passage through which juice may escape, a circular cutter mounted in said movable cup and having an annular cutting edge extending into the cavity of said movable cup to cut a circular incision in the fruit upon initial interdigitation of said fingers, and means including radially disposed portions of the inner edges of the fingers of said movable cup defining an annular passage around the circular cutter in said movable cup through which peel is forced as the interdigitation of the fingers proceeds, the dimensions of said passage being proportioned relative to the thickness of the peel so that the inner edges of the fingers shred the surface of the peel as the peel passes through said passage.

7. A device for processing whole citrus fruit comprising a stationary lower cup, an upper cup mounted in coaxial relation with said lower cup and movable downwardly toward said lower cup, each of said cups having a bowl-like cavity defined by curved portions of the inner edges of a multiplicity of radially disposed narrow fingers separated by correspondingly narrow slots, the fingers of each cup being aligned with the slots of the other cup for interdigitation and the cavities of said cups being shaped so that said inner edges contact the outer surface of a single fruit at areas disposed substantially entirely around the fruit upon initial interdigitation of said fingers, a tubular cutter mounted in said stationary lower cup having a cutting edge extending into the cavity of said lower cup to cut a plug in the fruit during interdigitation of said fingers, the axial opening of said tubular cutter providing a passage for discharge of juice from said fruit, a cutter mounted in said upper cup having a depending cutting edge extending into the cavity of said upper cup to cut a plug in the fruit during interdigitation of said fingers, the inner edges of the fingers of said upper cup outside of the cavity therein having straight portions disposed in parallel spaced relation to the outer wall of the cutter mounted in said upper cup to define a passage around said outer wall through which peel is extruded upwardly as the interdigitation of the fingers proceeds.

8. A device for processing whole citrus fruit comprising a stationary lower cup, an upper cup mounted in coaxial relation with said lower cup and movable downwardly toward said lower cup, each of said cups having a bowl-like cavity defined by curved portions of the inner edges of a multiplicity of radially disposed narrow fingers separated by correspondingly narrow slots, the fingers of each cup being aligned with the slots of the other cup for interdigitation and the cavities of said cups being shaped so that said inner edges contact the outer surface of a single fruit at areas disposed substantially entirely around the fruit upon initial interdigitation of said fingers, a tubular cutter mounted in said stationary lower cup having a cutting edge extending into the cavity of said lower cup to cut a plug in the fruit during interdigitation of said fingers, the axial opening of said tubular cutter providing a passage for discharge of juice from said fruit, a cutter mounted in said upper cup having a cutting edge extending downward into the cavity of said upper cup to cut a plug in the fruit during interdigitation of said fingers, the inner edges of the fingers of said upper cup outside of the cavity therein having straight portions disposed in parallel spaced relation to the outer wall of the cutter mounted in said upper cup to define a passage around said outer wall through which peel is extruded upwardly as the interdigitation of the fingers proceeds, the junction of the curved bowl-defining portion of each finger in the upper cup with the straight passage-defining portion of the finger providing an abutment edge against which the peel is pressed as it passes through said passage.

References Cited in the file of this patent

UNITED STATES PATENTS

| | | |
|---|---|---|
| 2,420,679 | Pipkin | May 20, 1947 |
| 2,649,730 | Hait | Aug. 25, 1953 |
| 2,649,731 | Polk et al. | Aug. 25, 1953 |